Figure 8:
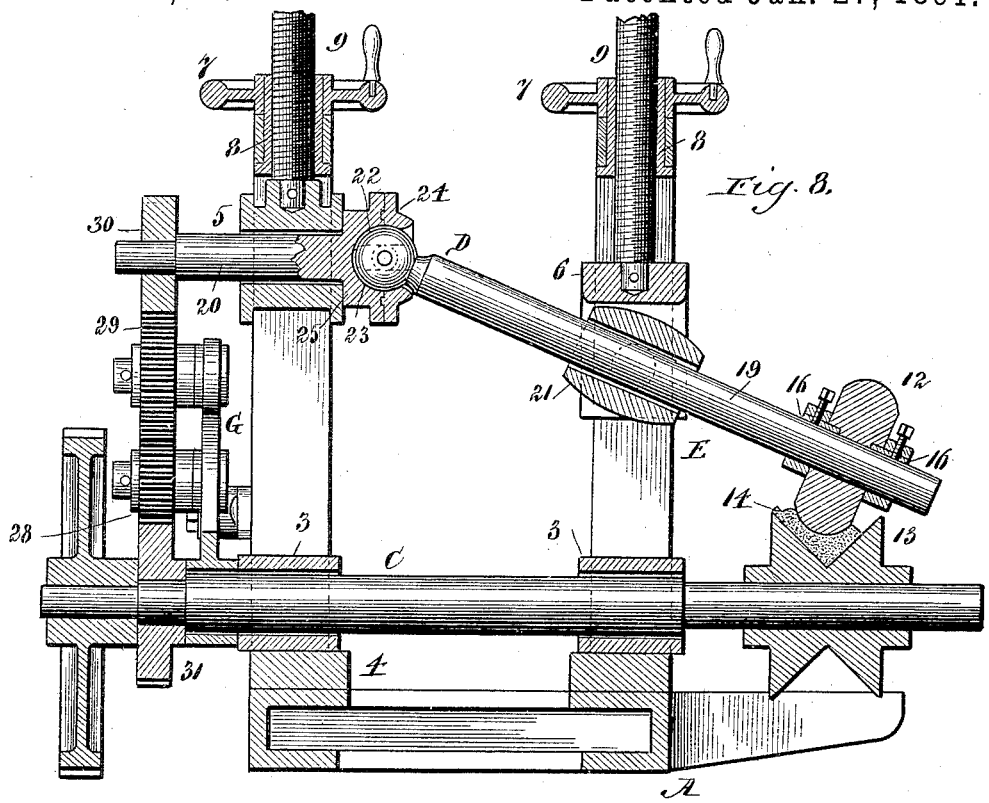

(No Model.)
4 Sheets—Sheet 1.
W. ZOELLER.
MOLDING MACHINE.
No. 445,215. Patented Jan. 27, 1891.
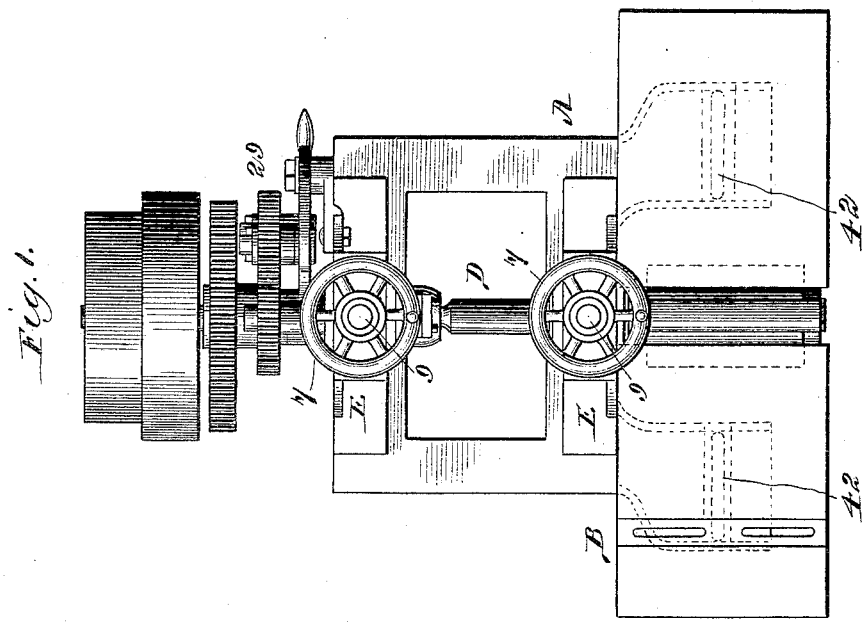
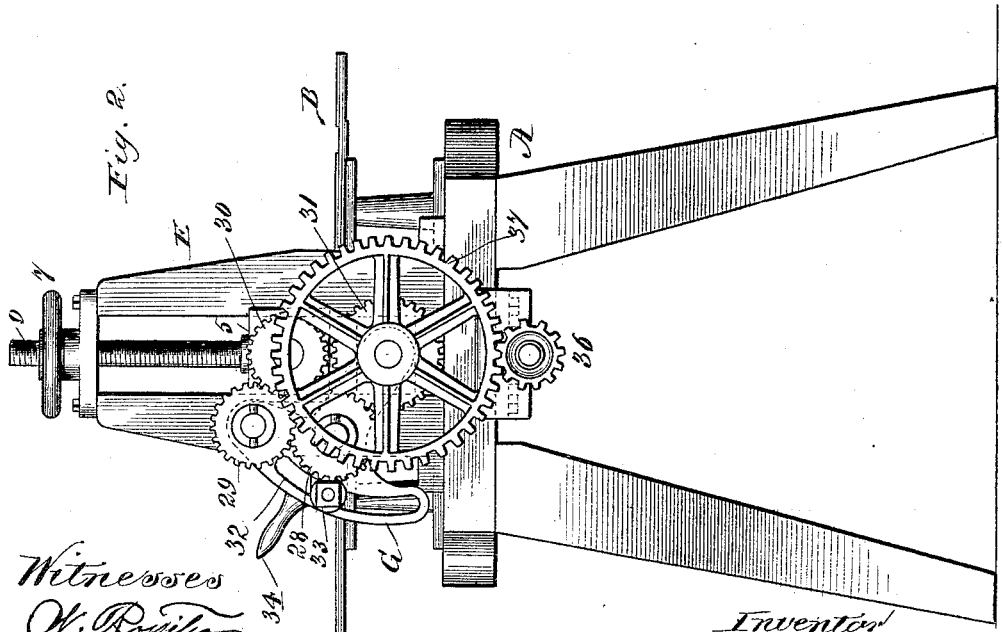
Witnesses
W. Rossiter
Harry C. Kennedy
Inventor
William Zoeller
By Chas. G. Page
Atty.

(No Model.) 4 Sheets—Sheet 2.
W. ZOELLER.
MOLDING MACHINE.
No. 445,215. Patented Jan. 27, 1891.
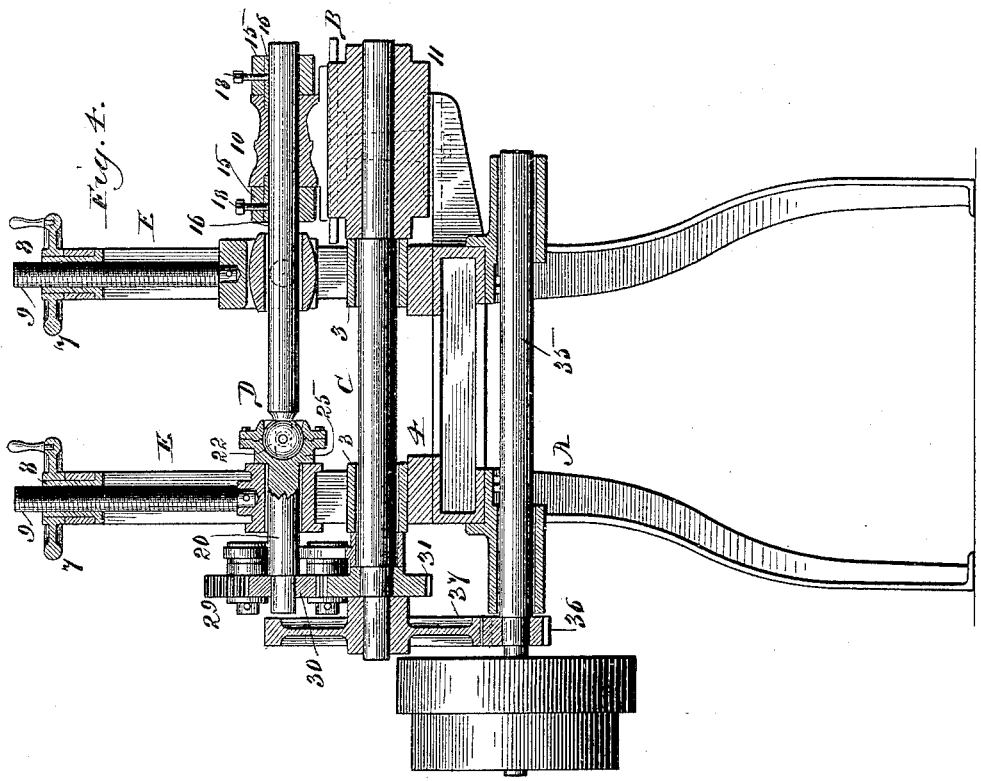
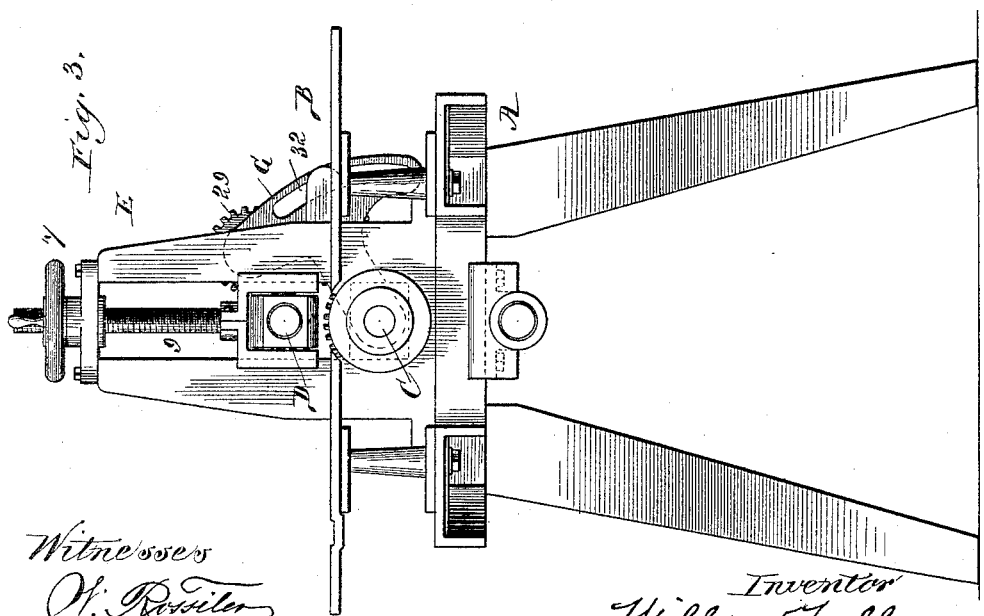
Witnesses
W. Rossiter
Harry C. Kennedy
Inventor
William Zoeller,
By Chas. G. Page
Atty.

(No Model.) 4 Sheets—Sheet 3.
W. ZOELLER.
MOLDING MACHINE.
No. 445,215. Patented Jan. 27, 1891.
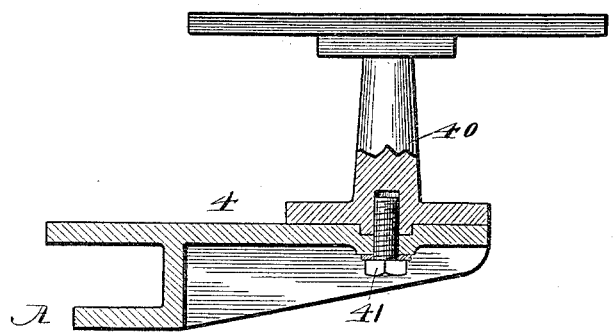
Fig. 6.
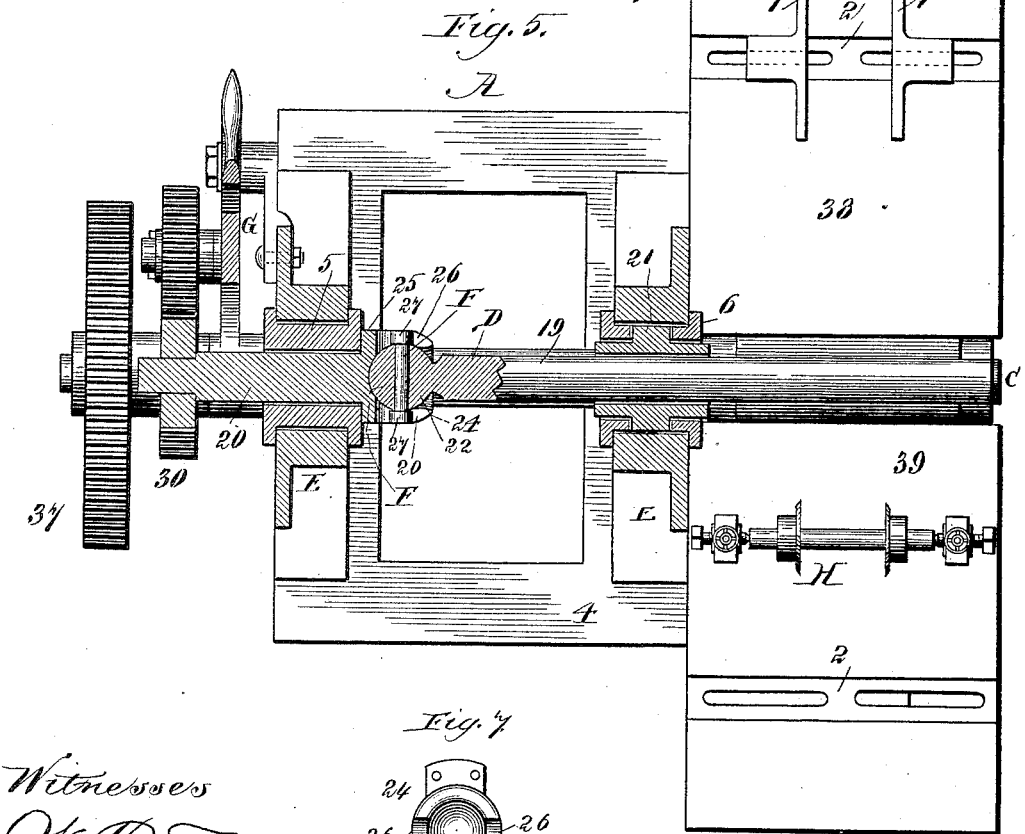
Fig. 5.
Fig. 7.
Witnesses
W. Rossiter
Harry C. Kennedy
Inventor
William Zoeller
By Chas. A. Page
Atty.

(No Model.) 4 Sheets—Sheet 4.
W. ZOELLER.
MOLDING MACHINE.

No. 445,215. Patented Jan. 27, 1891.

Witnesses
W. Rossiter
Harry C. Kennedy

Inventor
William Zoeller
By Chas. G. Page
Atty.

UNITED STATES PATENT OFFICE.

WILLIAM ZOELLER, OF CHICAGO, ILLINOIS.

MOLDING-MACHINE.

SPECIFICATION forming part of Letters Patent No. 445,215, dated January 27, 1891.

Application filed July 1, 1890. Serial No. 357,380. (No model.)

*To all whom it may concern:*

Be it known that I, WILLIAM ZOELLER, a citizen of the United States, residing at Chicago, in the county of Cook and State of Illinois, have invented a certain new and useful Improvement in Molding-Machines, of which the following is a specification.

My invention relates to a construction of machine adapted for producing ornamental moldings and involving a pair of rotary dies or rolls, between which a strip of molding faced with some suitable plastic material is fed and ornamented by the embossing action of one of the dies or rolls upon the plastic facing. The strip of molding referred to may be a long wooden strip, and the plastic material for facing the same can be placed upon the strip either by hand or by an automatic feed device, the preferred way being for an attendant to supply the plastic material to the strip at a point adjacent to and at the feed side of the dies or rolls, whereby the embossing-roll will both spread the material upon the strip and shape the same in accordance with the particular pattern by which the embossing-die is characterized.

The more prominent objects of my invention are to provide for a ready and effective adaptation of the machine to different kinds and styles of moldings, and to avoid all dismemberment of the machine in changing either or both of the dies or rolls, it being here observed that different dies are necessary to the production of different styles or pattern of ornamental work upon the face portions of these strips of molding, and also that the backs of said strips frequently vary in shape in cross-section—as, for example, in some instances they may be flat, in others concave, and in others angular—and hence that the employment of a roll corresponding in form with the form of the back of the strip is desirable.

To the attainment of the foregoing and other useful ends my invention consists in matters hereinafter set forth, and particularly pointed out in the claims.

Figure 9:
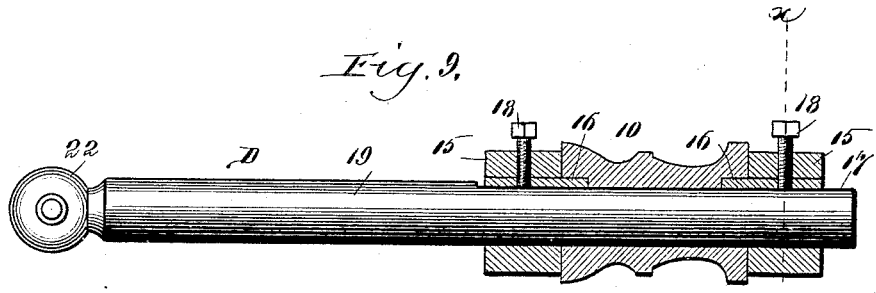
Figure 10:
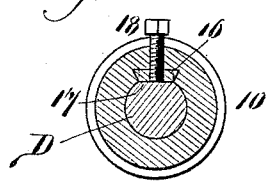

In the accompanying drawings, Figure 1 is a plan view of a molding-machine embodying my invention. Fig. 2 represents the same in side elevation. Fig. 3 is a side elevation of the machine as viewed from the side opposite to that shown in the preceding figure. Fig. 4 is a vertical section on a plane coincident with the axes of the arbors, which are shown in elevation, with the exception that a portion of the upper jointed arbor is shown in longitudinal section. Fig. 5 is a sectional plan of the machine on a scale slightly larger than that of the preceding figures, the section in this view being on a horizontal plane through the axis of the upper jointed arbor, which is partially shown in section. Fig. 6 is a detail showing in elevation one of the adjustable tables and in vertical section the lower portion of its standard and a portion of the main supporting-frame whereon the table-standard is adjustably held. Fig. 7 is an end view of one of the sections of the jointed upper arbor, and shows the socket adapted for the reception of the rounded or substantially spherical end of the other section of the arbor. Fig. 8 is a vertical section on a plane coincident with the axes of the arbors. In this view the arbors are shown in elevation, with the exception that a portion of one of them is represented in longitudinal section; also, one of the arbors is shown deflected or inclined downwardly, for purposes hereinafter described. Fig. 9 represents one of the sections of the upper arbor, and illustrates the way in which a molding or embossing die or roll, shown in longitudinal section, can be detachably secured thereon. Fig. 10 is a section on line X X in Fig. 9.

The main frame A is provided with bearings appropriate for the several operative members of the machine, and is adapted to bring the work-table B, which is supported thereon, in position convenient for an attendant. This work-table is adapted to support and guide the work to and from a pair of rotary molding-dies, or "embossing-rolls," as they may indifferently be termed, and as a means for adapting the table for work of different widths it is desirably provided with adjustable guides arranged, respectively, at the feed and delivery sides of the embossing-rolls, as indicated in Fig. 5. In said figure I have shown at one side of the embossing-rolls an adjustable guide comprising a couple of cheek-pieces 1, which are understood to be adjustably secured to a slotted guideway 2 in the table and arranged for adjustment laterally to the line of feed. For convenience of illustration, the adjustable guide at the opposite side of the embossing-rolls is omitted, the guideway 2 therefor being, however, represented. The embossing-rolls revolve about axes which are normally horizontal, but which may be relatively inclined when demanded by the character of the work, as hereinafter more particularly set forth. As a means for supporting and operating the embossing-rolls, the machine is provided with a couple of rotary shafts or arbors C and D, arranged one above the other and adapted to receive such dies or rolls as it may be desired to employ for feeding and embossing the work.

The bearings or boxes 3 for the lower arbor C can be fixed upon the main frame, so as to maintain said arbor in a horizontal position and preserve a fixed relationship between its axis and the plane of the table, although arrangement could obviously be made for the vertical adjustment of said bearings or for a vertical adjustment on the part of the table, so that in either case the plane of the table would in effect be adjusted with reference to the employment of rolls of different diameters on the lower arbor.

The upper arbor D is carried by vertically-adjustable boxes 5 and 6, arranged within standards or housings E, which rise from the upper portion 4 of the main frame. These boxes for the upper arbor can be raised and lowered by any suitable adjusting devices—as, for example, by means of hand-wheels 7, provided with nuts 8, confined at the upper ends of the housings and arranged to engage screw-rods 9, attached to and arranged to extend from the boxes up to and through the nuts. By such arrangement the upper arbor can be raised and lowered with reference to the lower arbor, and hence the upper embossing-roll can be set with reference to different thicknesses of work. While the devices for adjusting the boxes 5 and 6 are operative independently of one another both devices can of course be operated to an equal extent, so as to preserve, when desired, a condition of parallelism between the axes of the two arbors.

As a matter of course, different rolls must be employed for different patterns. This change of rolls will be more frequently incident to the upper roll, which is intended to produce an ornamental facing along the strip of molding, although it will also be found desirable to change at times the lower roll, which, while acting as a feed and supporting roll, should conform to the back of the strip, which in some cases is flat and in others concaved or otherwise shaped in transverse section. In order to permit this change of rolls to be made in an exceedingly convenient way and without either loss of time or necessity for dismembering or taking the machine apart or taking out either or both arbors, (as would be the case if the rolls were fixed on the arbors at points between the housings,) I extend the shafts or arbors C and D beyond their bearings in the housings, so as to provide them, respectively, with extensions projecting from one side of the machine and exposed, so that rolls or dies can be readily slipped on and off their said extended ends.

By way of illustrating one of the changes which it may be desired to make, I have shown in Fig. 4 one form of die or roll 10, detachably secured on the upper arbor and adapted for embossing the face of a strip of molding, while upon the lower arbor I have shown a straight cylindric roll 11, adapted for a strip having a flat back surface. In Fig. 8, however, I have shown a different form of die or roll 12 on the upper arbow and upon the lower arbor I have represented a roll 13, adapted for a strip of molding 14, having a back surface, which is angular in cross-section. The dies or rolls can be detachably keyed or secured upon the arbors in various ways. As an illustration of one of such, I have shown the die or embossing roll 10 sleeved upon the arbor D and held in place thereon by collars 15, arranged to abut against its ends, and keys 16 engaging said collars and embossing-roll. With such arrangement the arbor can be flattened along a portion of its length, as at 17, and the keys fitted to such flattened portion and held against end slip by set-screws 18. By reason of the foregoing-described arrangement of bearings or boxes, the arbors can be mounted so as to work true and steady, while at the same time the dies or rolls can be slipped off the arbors without removing the latter from their bearings.

As a means for effecting a relative inclination of the axes of the arbors, the arbor D is jointed so that its section 19, which carries the upper die or roll can, when so desired, be inclined by adjusting its supporting-boxes 5 and 6. The jointed arbor D comprises, therefore, a couple of sections 19 and 20, respectively carried by the boxes 6 and 5. The arbor-section 19 is preferably made somewhat longer than the section 20, and is mounted in a bearing 21, which is trunnioned in the box 6, so that it will adapt itself to the inclination of this portion of the arbor, as illustrated in Fig. 8, wherein the character of the work is such as to render it desirable to so position the die or embossing roll 12 that it shall revolve about an inclined axis. The rocking bearing 21, being free to rock independently of the box 6, by which it is supported, permits the adjustment of the arbor-section 19 to any desired degree of inclination by simply adjusting either or both of the boxes 5 and 6. Of course so long as the boxes are stationary the arbor-section 19 and its rocking bearing 21 cannot tilt independently of the arbor-section 20; but said rocking bearing is free to tilt or rock when either of the boxes is adjusted vertically in its allotted housing.

As a simple and efficient joint between the sections of the arbor D, one of them is provided with a rounded or substantially spherical end 22, which is received within a concaved seat or socket 23 (see Fig. 7) in the adjacent end of the other section, and held in said socket by a cap-plate 24, which is bolted to the enlarged end portion 25 of the arbor-section 20 and adapted to form, in conjunction with the concavity therein, a two-part seat or bearing for the substantially spherical end 22 of the arbor-section 19. The ball-and-socket joint thus formed between the two sections of the upper arbor permits the section which carries the upper die or roll to be swung up and down independently of the arbor-section 20 by adjusting the box 6. In order to provide suitable power-transmitting connection between said two sections of the upper arbor, the two-part bearing on arbor-section 20 is slotted at opposite sides, as at 26, to receive small rolls 27 on the ends of a pin F, which extends through the rounded end of the arbor-section 19. By this arrangement the engagement of the sides of the slots with the ends of the pin will cause the arbor-section 19 to revolve with the arbor-section 20 when the latter is driven, while at the same time the pin, which is transverse to the axis of the arbor-section 19, can assume such angle relatively to the axis of the arbor-section 20 as the position of said section 19 may demand. By lowering the box 6, as shown, for example, in Fig. 8, the arbor-section 19 can be tilted downwardly from the joint by which it is connected with the section 20, which latter will remain in a horizontal position, and thus avoid any cramping of the gearing employed for driving it. In connection with the driving-gear employed for operating the two shafts or arbors C and D, I may provide any known or suitable construction of "expansion-gearing" adapted to form between the two arbors a gear-connection which shall preserve its integrity as a power-transmitting connection regardless of the vertical adjustment of one arbor independently of the other arbor. As a simple and preferred arrangement, however, I hang upon the arbor C a bearing-plate G, which carries a couple of intermeshing gears 28 and 29, one of which engages a gear 30 on the upper arbor, while the other engages a gear 31 on the lower arbor. By thus hanging the bearing-plate on the lower arbor it may have a desired extent of swing or rotary adjustment about the axis of said arbor, and as a means for locking the bearing-plate in proper adjustment with relation to the distance between the axes of the gears 30 and 31 it is provided with a curved slot 32 for some suitable locking device, such as a set-screw or bolt and nut, as at 33. The bearing-plate can also be provided with a handle 34 for convenience in adjusting it. As herein shown, the pulley-shaft 35 is conveniently arranged below and parallel with the lower arbor, and is connected therewith through the medium of the gears 36 and 37, respectively, on the pulley-shaft and the lower arbor.

The table B is divided into a couple of sections 38 and 39, which are arranged, respectively, at the feed and delivery sides of the die or roll on the lower arbor. These two parts or sections of the table are adjustable horizontally and independently of one another in directions laterally to the lower arbor, so that the space between their opposing ends can be varied in width in accordance with the diameter of the die or roll employed upon the lower arbor. As an illustration of one of various obvious ways in which those two parts of the table can be supported and adjusted, I have herein provided each table with a supporting-standard 40, adjustably held in a slotted guideway in the upper portion 4 of the main frame by a set-screw or bolt 41, arranged to pass up through a slot in the main frame and engage in the table-standard, as best shown in Fig. 6, it being observed that the slots for said bolts are indicated by dotted lines 42 in Fig. 1. It will also be obvious that the supporting-standards for the tables can be made adjustable in height in any of the ways in which table-standards for other purposes have been made adjustable.

From the foregoing it will be seen that the two rotary shafts or arbors are geared up at one side of the pair of standards or housings, and so extended out from the opposite side of said standards or housings that the dies or rolls can be readily applied to and removed from their said extended ends, and that to thus change either or both of the dies or rolls it will not be necessary to remove the arbors from their bearings; also, that the presence of the two vertically-adjustable boxes for the upper roll is essential both to the steady and accurate working of the upper arbor and to its vertical adjustment as a whole with reference to the employment of dies or rolls of different diameter or with reference to the thickness of the work.

In Fig. 5 I have shown at H a couple of rotary cutters or trimmers for trimming the plastic facing along the edges of the molding.

What I claim as my invention is—

1. The combination, substantially as hereinbefore set forth, in a molding-machine, of the two standards or housings, the lower horizontally-arranged arbor C, extended at one end beyond the pair of standards or housings and carrying upon its extended end a suitable roll or die, the upper jointed arbor D, composed of a section 19, having its inner end portion extended between the two standards or housings and its outer end portion provided with a suitable roll or die and extended beyond the pair of standards or housings, and a section 20, supported in a vertically-adjustable box and connected with the inner end of the arbor-section 19 by a single universal joint at a point between the standards or housings, and a rocking bearing supporting the arbor-section 19 and pivoted to a vertically-adjustable box, so as to have a free rocking action independent of said box during the vertical movement of either of the two boxes in their allotted standards or housings.

2. The combination, substantially as hereinbefore set forth, of a rotary arbor for the lower die or roll and a rotary jointed arbor for the upper die or roll, each section of said upper jointed arbor being supported in vertically-adjustable bearings and one of said sections being provided with expansion-gearing, whereby the integrity of the power-transmitting connection for driving said adjustable jointed arbor will always be preserved.

3. The combination, substantially as hereinbefore set forth, of a rotary arbor for the lower die or roll, the rotary jointed adjustable arbor for the upper die or roll, vertically-adjustable boxes for the sections of the jointed arbor, one of the said boxes being provided with a pivoted bearing permitting the tilting of one section of said jointed arbor, the other section being provided with expansion-gearing for the purpose described.

4. The combination, substantially as hereinbefore set forth, of a rotary arbor for the lower die or roll, a rotary jointed arbor for the upper die or roll, adjustable boxes in which the sections of the jointed arbor are supported, one of said boxes being provided with a pivoted bearing permitting the tilting of one section of said jointed arbor, the other section being provided with expansion-gearing for the purpose described, housings in which the said boxes are arranged, and means, substantially as described, mounted upon said housings and connected with said boxes, for adjusting the latter.

5. The combination, substantially as hereinbefore set forth, of a rotary arbor for the lower die or roll, a rotary arbor for the upper die or roll, vertically-adjustable boxes carrying the arbor for the upper die or roll, a pair of housings for said boxes, said arbors being extended beyond the housings and provided on their extended ends with dies or rolls in co-operative relationship to the table, said dies and rolls being removably secured to said arbors, for the purpose described.

6. The combination, substantially as hereinbefore set forth, in a molding-machine, of the arbors provided with suitable dies or rolls, and the two-part table B, arranged to provide space between the opposing ends of its sections for a die or roll on the lower arbor, and having its said sections adjustably supported so that they can be adjusted to vary the width of said space in conformity with the size of die or roll employed on the lower arbor.

WILLIAM ZOELLER.

Witnesses:
T. WAGNER,
HARRY COBB KENNEDY.